United States Patent [19]

Mnilk et al.

[11] 3,743,141

[45] July 3, 1973

[54] MIXING APPARATUS FOR LIQUIDS

[75] Inventors: Reinhold Mnilk, Dortmund-Wickede; Manfred Keil, Dortmund; Karl-Heinz Finger, Dortmund-Oespel, all of Germany

[73] Assignee: Holstein & Kappert Maschinenfabrik "Phonix" GMBH, Dortmund, Germany

[22] Filed: May 14, 1971

[21] Appl. No.: 97,410

[30] Foreign Application Priority Data
Nov. 15, 1970 Germany............ P 19 57 501.0

[52] U.S. Cl................. 222/67, 137/565, 137/604, 222/136, 222/145
[51] Int. Cl............................................. B67d 5/08
[58] Field of Search................... 222/67, 68, 135, 222/136, 137, 145, 129.1, 129.4, 64, 65, 66, 134; 137/98, 101.25, 101.27, 412, 423, 429, 430, 604, 565, 433

[56] References Cited
UNITED STATES PATENTS
3,237,808   3/1966   Witt et al........................ 222/145 X
2,885,118   5/1959   Remke............................... 222/68
2,750,076   6/1956   Welty et al. .................... 222/129.1

FOREIGN PATENTS OR APPLICATIONS
540,835   12/1931   Germany......................... 222/145

Primary Examiner—Samuel F. Coleman
Assistant Examiner—Larry Martin
Attorney—Michael S. Striker

[57] ABSTRACT

Two or more vessels are provided each having therein a different liquid components which is to be admixed with the liquid components in the other vessels. A pump is located at a level lower than the vessels and a mixing chamber is located between the vessels and the pump. Conduits connect the mixing chamber with the respective vessels and a single conduit connects the mixing chamber with the suction side of the pump. Throttling means is provided in each of the conduits connecting the vessels with the mixing chamber.

9 Claims, 1 Drawing Figure

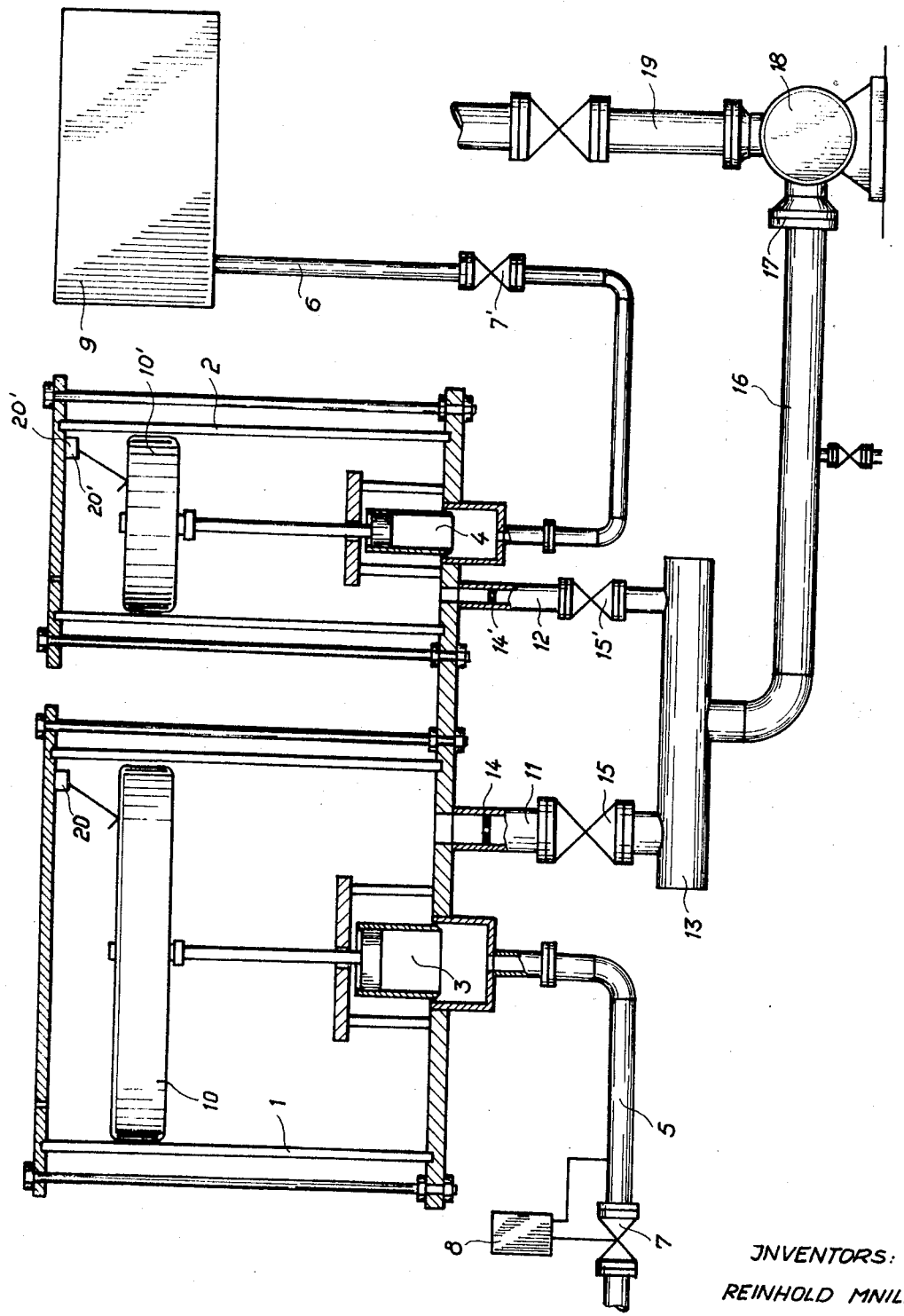

MIXING APPARATUS FOR LIQUIDS

BACKGROUND OF THE INVENTION

The present invention relates generally to a mixing apparatus, and more particularly to a mixing apparatus for the admixing of liquid components. Still more specifically the present invention relates to a novel mixing apparatus for admixing liquid components in a predetermined ratio.

Apparatus for admixing liquid components in a predetermined ratio is already known. It is thus, for instance, known to have an apparatus which provides the various different liquid components either in supply conduits or in supply vessels into which they are introduced by such conduits. Each supply conduit or, if provided, each vessel is associated with a separate rotary pump which withdraws liquid component from the respective conduit or vessel and introduces it via throttling devices located at the pressure side of the pump into a mixing chamber where the various liquid components are admixed with one another and from where the resulting mixture is passed onto further processing stations, for instance bottling stations. This prior-art apparatus suffers from the disadvantage that it is complicated in that it requires an individual pump to be associated with each supply conduit or supply vessel. This, however, is not the most serious drawback of this known apparatus; rather, the most serious difficulty is the fact that any fluctuations at one side of the pump, be it the pressure side or the suction side, resulting from variations in the pumping capacity due to fluctuations in the current supply, different liquid flow conditions or the like, will be reflected in substantial variations in the ratio of admixture of liquid components in the mixing chamber. This is a condition which is not tolerable.

Another known construction provides a mixing chamber into which supply conduits discharge the various different liquid components to be admixed. A central outlet conduit communicates with the mixing chamber through which the admixture can leave. Devices are provided in the mixing chamber which cooperate with valves provided in the inlet conduits and which regulate the quantity of liquid component which can flow into the mixing chamber from the respective conduit in dependence upon the conditions in the mixing chamber itself. After the latter is filled, these devices control the evacuation of the resulting mixture by means of a pump. The difficulty with this latter apparatus is the fact that for each different mixture ratio a separate device must be provided which is responsive to the conditions in the mixing chamber and can thus control the inflow of liquid component from the various different supply conduits. Thus, if the ratio is to be changed the control device must be exchanged for another one which is not only time-consuming but of course also expensive in terms of down time of the apparatus, labor required and the necessity to keep a variety of different devices of this type on hand.

SUMMARY OF THE INVENTION

It is, accordingly, an object of the present invention to overcome the aforementioned disadvantages.

More particularly it is an object of the present invention to provide a very simple but highly reliable apparatus for admixing of liquid components.

A concomitant object of the invention is to provide such an apparatus in which proper maintenance of the ratio between the various liquid components is always reliably maintained.

In pursuance of the above objects, and others which will become apparent hereafter, one feature of the invention resides in a mixing apparatus for liquids which, briefly stated, comprises at least a first and a second vessel each containing a different liquid component. A pump is located on a level different from the vessels and a mixing chamber is provided. A pair of first conduits each connecting one of these vessels with the mixing chamber for supplying the respective liquid component to the latter, and a second conduit connects the mixing chamber with the suction side of the pump for supplying the mixed liquid components thereto.

Adjustable throttling means is provided in each of the first conduits for throttling the flow of liquid component therethrough.

The liquid components which are to be admixed are introduced into the respective supply vessels via sliding ring valves which are controlled by floats accommodated in the respective vessels and responsive to the level of liquid component therein. From the vessel the liquid components are, in accordance with one embodiment of the invention, supplied to the mixing chamber in precisely controllable quantities via gravity feeds and throttling devices by way of which they are supplied to the mixing chamber which is located upstream of the suction side of the pump. By having the throttling devices interposed between the supply vessels and the mixing chamber, and by in turn having the mixing chamber directly connected with the suction side of a single pump, any fluctuations which may occur in the throughput of liquid through the pump can no longer vary the mixture ratio of the individual liquid components, because they will now proportionately affect each of the liquid components as it flows from its respective receptacle to the mixing chamber.

According to a further embodiment of the invention each of the vessels may be provided with a float cooperating with valves provided in the inlet conduit through which the vessel is supplied with its respective liquid component, and with valves provided in the outlet conduit communicating with the mixing chamber, the cooperation being such that when the float is at a predetermined upper level the valve in the outlet conduit will be opened and the valve in the inlet conduit will be closed, whereas a descent of the float from the upper level causes the inlet conduit valve to become opened while that in the outlet conduit remains open, while arrival of the float at a predetermined lower level closes the valve in the outlet conduit while the valve in the inlet conduit remains open. In this manner it is possible to precisely adjust the level of liquid in the respective vessels. If, for instance, the supply of a liquid component into the respective vessel decreases due to difficulties in the inlet conduit or through other problems, this does not influence the mixture ratio obtained in the mixing chamber because according to the present invention the floats are so associated with control elements that when the float in only one of the vessels descends below its predetermined lower level, the outlet valves in the outlet conduits of all vessels are closed. In fact, at the same time the pump may also be de-energized.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE is a somewhat diagrammatic illustration of an apparatus embodying the invention.

DESCRIPTION OF THE PREFERRED EMBODIMENTS

Discussing now the drawing in detail it will be seen that the exemplary embodiment illustrated has two vessels 1 and 2 which may, for instance, accommodate the two liquid components to be admixed, assumed here to be water and a fruit syrup. Of course, more than two vessels may be provided and they may each accommodate a different liquid component. In the lower region of each of the vessels 1 and 2 there is provided a sliding ring valve 3 and 4, respectively, of known construction. An inlet conduit 5 for water communicates with the valve 3 and a similar inlet conduit 6 for syrup communicates with the valve 4. A valve 7 is installed in the conduit 5 and a similar valve 7' in the conduit 6, to permit shutting-off of liquid flow through the respective conduits. The valve 7 is further provided with a known pressure-reducing device 8 which guarantees constant flow pressure of the incoming water. In the illustrated embodiment such a device is not necessary in conjunction with the conduit 6 because the syrup is supplied under static pressure from a container 9 which is at a level above the vessel 2. However, it would of course be possible to use a pressure-reducing device 8 in conjunction with the conduit 6 also, for instance if syrup were to be supplied from a container located at a lower level than the vessel 2 and from which it would have to be supplied by means of a pump.

A float 10 is accommodated in the vessel 1 and a similar float 10' in the vessel 2. The floats act directly upon the valves 3 and 4, respectively, as illustrated. A gravity feed first conduit 11 communicates with the vessel 1 at the bottom wall thereof, and a similar conduit 12 communicates with the vessel 2 at the bottom wall thereof. The conduits 11 and 12 each communicate with one another by means of a mixing chamber 13 and they each have interposed in them a throttling device 14, 14', respectively, and a valve 15, 15', respectively. The throttling devices and valves are of known construction and need not be further discussed, but it is pointed out that the throttling devices 14, 14' are of the type which is adjustable to permit a variation in their throttling action.

A second conduit 16 connects the mixing chamber 13 with the suction inlet 17 of a rotary pump 18, whose pressure outlet 19 communicates with a further processing station for the mixed liquids, for instance a bottling station, a carbonizing station or the like.

Water is supplied at a low pressure which can be regulated by means of the device 8, through the conduit 5 into the vessel 1 and when the float 10 therein reaches a predetermined upper level, it shuts off the valve 3 so that no further water flows in. At the same time syrup flows out of the container 9 through the conduit 6 into the vessel 2 until again the float 10' therein has reached the desired upper level at which it will close the valve 4 and prevent further entry of syrup. During the filling of the two vessels 1 and 2, the valves in the gravity feed conduits 11 and 12 are closed.

When the vessels 1 and 2 are filled to the desired extent, which has been reached when the floats 10 and 10' reach their upper-level position, control devices 20, 20' of known construction—which cooperate with the floats 10, 10'—open the valves 15 and 15' in response to the floats 10, 10' reaching their upper-level positions. Now each individual liquid component—that is water and syrup—flows under static pressure in precisely determined partial quantities through the throttling devices 14, 14' provided for this purpose, into the mixing chamber 13 in which they become admixed and from where they are withdrawn by the pump 18 through the conduit 16.

The suction exerted by the pump 18 upon the mixing chamber 13, or rather upon the mixture of liquid components therein, causes the floats 10, 10' to descend slightly from their upper-level position with the result that the valves 3 and 4 become opened in response to the slight descent of the floats 10 and 10', respectively. Obviously, as the valves 3 and 4 open water and syrup can begin to flow again through the conduits 5 and 6, respectively, into the vessels 1 and 2 to thereby replenish the liquid component which has been withdrawn from the respective vessels into the mixing chamber 13. In operation of the device the floats 10 and 10' in effect shuttle between a predetermined filling-level tolerance, that is between a predetermined upper and lower level. Small fluctuations due to various circumstances, such as unequal withdrawal from the respective vessels or inadequate supply through the conduits 5 and 6, respectively, are thus accommodated without requiring shutting-down of the apparatus.

If, on the other hand, one of the floats 10, 10' drops below the predetermined lowest level due to for instance an inadequate supply of liquid component to its associated vessel, then the float 10 or 10' acts upon its associated control device 20 or 20' with the result that the outlet valves 15, 15' associated with both vessels are immediately closed by these devices. Advantageously, the pump 18 will also be energized at the same time. The apparatus is reactivated only after both floats again reach their upper-level position.

It will be appreciated that modifications are possible in the exemplary apparatus described herein. If, for instance, several liquid components are to be admixed in a predetermined ratio, then additional vessels may be provided until a number of vessels is reached which corresponds to the number of liquid components to be admixed. Again, each of these additional vessels will have an outlet conduit communicating with the common mixing chamber and will be controlled by the various valves and floats as described above with respect to the vessels 1 and 2.

It will be understood that resort to the present invention provides a liquid mixing apparatus which is very simple but highly reliable and in which variations in the mixture ratio of the various liquid components due to variations in the operation of the pump are reliably precluded.

It will be understood that each of elements described above, or two or more together, may also find a useful application in other types of constructions differing from the types described above.

While the invention has been illustrated and described as embodied in a liquid mixing apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a mixing apparatus for liquids, in combination, at least a first and a second vessel each containing a different liquid component; a pump located on a level different from said vessels; a mixing chamber on a level below said vessels; a pair of first conduits each connecting one of said vessels with said mixing chamber for supplying the respective liquid component to the latter; a second conduit connecting said mixing chamber with the suction side of said pump for supplying the mixed liquid components thereto; adjustable throttling means in each of said first conduits; and regulating means for maintaining the level of liquid components in said vessels substantially equal, so as to assure a substantially uniform pressure head in said first conduits.

2. In a mixing apparatus as defined in claim 1, wherein said first conduits are at least in part vertical; and wherein said throttling means are provided in the respective vertical parts.

3. In a mixing apparatus as defined in claim 1; further comprising inlets for liquid component to the respective vessels; shut-off valve means associated with one of said inlets; and wherein said regulating means is associated with and controls operation of said shut-off valve means.

4. In a mixing apparatus as defined in claim 3; further comprising supply conduits each communicating with one of said inlets.

5. In a mixing apparatus as defined in claim 4, said regulating means comprising, outlet valve means in said first conduits, and float means in the respective vessels movable therein between a predetermined upper and lower level and operative for closing said shut-off valve means and opening said outlet valve means upon reaching said upper level, for opening said shut-off valve means in response to movement towards said lower level from said upper level, and for closing said outlet valve means upon reaching said lower level.

6. In a mixing apparatus as defined in claim 1; further comprising supply conduits each communicating with one of said vessels for supplying the respective liquid component thereto; and pressure-reducing means provided in at least one of said supply conduits.

7. In a mixing apparatus as defined in claim 5; and further comprising control means operatively associated with said float means and said outlet valve means for closing the latter in said first conduits in response to said float means reaching said lower level.

8. In a mixing apparatus as defined in claim 5, said float means comprising two floats each provided in one of said vessels, and said outlet valve means comprising two outlet valves each provided in one of said first conduits; and further comprising control means operatively associated with said outlet valve means and said float means for closing both of said outlet valves in response to at least one of said floats reaching said lower level.

9. In a mixing apparatus as defined in claim 1, wherein said pump is a rotary pump.

* * * * *